United States Patent
Nelliappan

(10) Patent No.: US 12,129,336 B2
(45) Date of Patent: *Oct. 29, 2024

(54) METHOD AND COMPOSITION FOR IMPROVED AGGLOMERATION RESISTANCE OF POLYAMIDE POLYMERS

(71) Applicant: AdvanSix Resins & Chemicals LLC, Parsippany, NJ (US)

(72) Inventor: Veera Nelliappan, Richmond, VA (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,349

(22) Filed: Nov. 11, 2022

(65) Prior Publication Data

US 2023/0116645 A1  Apr. 13, 2023

Related U.S. Application Data

(62) Division of application No. 16/493,518, filed as application No. PCT/US2018/028069 on Apr. 18, 2018, now Pat. No. 11,525,035.

(60) Provisional application No. 62/490,704, filed on Apr. 27, 2017.

(51) Int. Cl.
| | |
|---|---|
| *C08G 69/36* | (2006.01) |
| *C08G 69/46* | (2006.01) |
| *C08K 5/20* | (2006.01) |

(52) U.S. Cl.
CPC ............. *C08G 69/36* (2013.01); *C08G 69/46* (2013.01); *C08K 5/20* (2013.01)

(58) Field of Classification Search
None
See application file for complete search history.

(56) References Cited

U.S. PATENT DOCUMENTS

| | | |
|---|---|---|
| 4,080,347 A | 3/1978 | Hefele |
| 4,146,675 A | 3/1979 | Moore et al. |
| 4,307,007 A | 12/1981 | Brodoway |
| 4,550,033 A | 10/1985 | Boutin |
| 5,006,368 A | 4/1991 | Louks |
| 5,919,530 A | 7/1999 | Hurley et al. |
| 6,060,553 A | 5/2000 | Lenczyk et al. |
| 6,777,488 B1 | 8/2004 | Araki et al. |
| 8,541,082 B2 | 9/2013 | Inaba |
| 8,883,917 B1 | 11/2014 | Davies et al. |
| 9,365,744 B2 | 6/2016 | Briffaud et al. |
| 11,525,035 B2 | 12/2022 | Nelliappan |
| 2005/0054739 A1 | 3/2005 | Kampf et al. |
| 2013/0131305 A1 | 5/2013 | Haeffner et al. |
| 2015/0000564 A1 | 1/2015 | Blanchard et al. |
| 2021/0130548 A1 | 5/2021 | Nelliappan |

FOREIGN PATENT DOCUMENTS

| | | |
|---|---|---|
| CN | 103539934 B | 6/2016 |
| CN | 105860058 A | 8/2016 |
| FR | 2930251 A1 | 10/2009 |
| JP | 07-228770 A | 8/1995 |
| JP | 2000-297150 A | 10/2000 |
| JP | 2005-239882 A | 9/2005 |
| KR | 10-0679899 B1 | 2/2007 |
| WO | 2015/160626 A1 | 10/2015 |
| WO | 2018/022328 A1 | 2/2018 |
| WO | 2018/165641 A1 | 9/2018 |

OTHER PUBLICATIONS

Machine translation of CN 105860058A (Year: NA).*
Deepika, S.K., & Chen, Y. (2014). Optimization of mailing parameters on the sunthesis of stearic acid coated CaCo3 nanoparticles. J. Coat. Technol. Res., Author's Copy, 10 pages.
International Search Report and Written Opinion received for PCT Patent Application No. PCT/US2018/028069, mailed on Aug. 7, 2018, 9 pages.

* cited by examiner

*Primary Examiner* — Rachel Kahn
(74) *Attorney, Agent, or Firm* — Faegre Drinker Biddle & Reath LLP

(57) ABSTRACT

The present disclosure provides a leaching process and resulting composition which prevents or substantially reduces agglomeration of polyamide 6/66 copolymers. The leaching process includes applying hot water in the presence of an agglomeration inhibitor to the polyamide 6/66 copolymers in order to separate unreacted caprolactam and small molecular weight oligomers from the copolymers while preventing or substantially reducing agglomeration of the copolymers.

5 Claims, No Drawings

METHOD AND COMPOSITION FOR IMPROVED AGGLOMERATION RESISTANCE OF POLYAMIDE POLYMERS

CROSS-REFERENCE TO RELATED APPLICATIONS

This application is a divisional application of U.S. application Ser. No. 16/493,518, filed Sep. 12, 2019, which is a U.S. 371 National Stage Application of International Application No. PCT/US2018/028069, filed Apr. 18, 2018, which claims priority to U.S. Provisional Application No. 62/490,704, filed Apr. 27, 2017, all of which are herein incorporated by reference in their entireties.

FIELD

The present disclosure relates to polyamide materials and, in particular, to a method and composition of a copolymer of polyamide 6 and polyamide 66 leached with an agglomeration inhibitor for use as a base resin for manufactured plastic articles, for example.

BACKGROUND

Currently, polyamide 6 (PA 6) and polyamide 66 (PA 66) copolymers are used as base resins for compositions of the type that are processed, typically via injection molding, for example, into finished articles that are commonly used in automotive, consumer goods, power tools, electrical, electronic, fiber, packaging, and other applications.

Polyamide polymers are polymerized from caprolactam monomers in the case of polyamide 6, and from hexamethylene diamine and adipic acid monomers in the case of polyamide 66. The polymerization reactions each involve the reaction of amine and acid end groups of the reactants along with the production of water via an equilibrium reaction according to Equation 1 below:

Equation 1

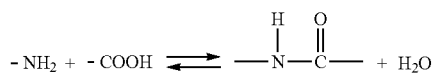

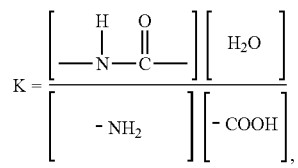

However, in the above reaction, some amounts of unreacted reactants, such as caprolactam, as well as small molecular weight oligomers, remain in the composition. The presence of such components is detrimental for downstream applications, and undesirable components, such as unreacted caprolactam and small molecular weight oligomers, are typically leached from the reactor using hot water, for example. For traditional polyamides, the leaching process may be readily carried out due to the high melting point of the polyamides produced, which is sufficiently high such that hot water may be used to leach the unreacted caprolactam and small molecular weight oligomers without damaging the polyamides.

However, other polyamides such as polyamide 6/66 copolymers formed from caprolactam, hexamethylene diamine and adipic acid monomers, which are produced to have lower melting points, tend to agglomerate during the leaching process upon exposure to hot water. In order to prevent agglomeration, the polyamide 6/66 copolymers are leached at substantially lower temperatures. However, leaching at substantially lower temperatures decreases the leaching efficiency. Additionally, the leaching process is typically carried out in relatively tall towers, and the polymer chips at the bottom of the tower can experience high levels of heat and pressure due to gravity which are conducive for agglomeration.

Thus, what is needed is an improved leaching process for separating unreacted reactants, such as caprolactam and small molecular weight oligomers, from polyamide 6/66 copolymers which prevents or substantially reduces agglomeration of the polyamide 6/66 copolymers.

SUMMARY

The present disclosure provides a leaching process and resulting composition which prevents or substantially reduces agglomeration of polyamide 6/66 copolymers. The leaching process includes applying hot water in the presence of an agglomeration inhibitor to the polyamide 6/66 copolymers in order to separate unreacted caprolactam and small molecular weight oligomers from the copolymers while preventing or substantially reducing agglomeration of the copolymers.

In one form thereof, the present disclosure provides a method of improving agglomeration resistance of a polyamide polymer including the steps of polymerizing at least one polyamide copolymer from caprolactam monomers and adipic acid and hexamethylenediamine monomers, the copolymer including between 80 mol % and 99 mol % caprolactam monomers and between 1 mol % and 20 mol % adipic acid and hexamethylenediamine monomers, based on the total moles of caprolactam monomers and adipic acid and hexamethylenediamine monomers; and leaching the at least one polyamide copolymer with a solution of water in the presence of an agglomeration inhibitor at a temperature between 80° C. and 140° C.

The agglomeration inhibitor may include at least one molecule of the formula $C_{10-25}OOH$, such as stearic acid. The agglomeration inhibitor may include at least one molecule of the formula $C_{10-25}CONH_2$, such as stearamide. The amount of agglomeration inhibitor used in the leaching step may be between 0.05 wt. % and 2 wt. %, based on the total solids weight of the copolymer.

The at least one polyamide copolymer may include between 80 mol % and 85 mol % caprolactam monomers and between 15 mol % and 20 mol % adipic acid and hexamethylenediamine monomers, based on the total moles of caprolactam monomers and adipic acid and hexamethylenediamine monomers.

In another form thereof, the present invention provides pellets formed of a polymeric base composition for use in manufacturing a finished article via melt processing, the polymeric base composition including at least one polyamide copolymer having acid/amine terminal ends and polymerized from caprolactam monomers and adipic acid and hexamethylenediamine monomers, the copolymer including between 80 mol % and 99 mol % caprolactam monomers and between 1 mol % and 20 mol % adipic acid and hexamethylenediamine monomers, based on the total moles of caprolactam monomers and adipic acid and hexamethylenediamine monomers, wherein a surface of the pellets has fewer acid/amine terminal ends than a core of the pellets.

The pellets may have a crush resistance, measured by a compression testing device according to ASTM D4179-11, between 5 pound-force and 55 pound-force. In the pellets, a degree of amine/acid termination of the polyamide copolymer may be between 30 and 70 mEq/kg. In the pellets, the at least one polyamide copolymer may include between 80 mol % and 85 mol % caprolactam monomers and between 15 mol % and 20 mol % adipic acid and hexamethylenediamine monomers, based on the total moles of caprolactam monomers and adipic acid and hexamethylenediamine monomers.

In another form thereof, the present invention provides a method of improving agglomeration resistance of a polyamide polymer, including the steps of forming at least one polyamide copolymer polymerized from caprolactam monomers and adipic acid and hexamethylenediamine monomers and including between 80 mol % and 99 mol % caprolactam monomers and between 1 mol % and 20 mol % adipic acid and hexamethylenediamine monomers, based on the total moles of caprolactam monomers and adipic acid and hexamethylenediamine monomers, the at least one polyamide copolymer having an initial concentration of acid/amine terminal ends; and leaching the at least one polyamide copolymer with a solution of water in the presence of an agglomeration inhibitor to reduce the initial concentration of acid/amine terminal ends by 5% to 25%.

The leaching step may be carried out at a temperature between 80° C. and 140° C. The agglomeration inhibitor may include at least one molecule of the formula $C_{10-25}OOH$. The agglomeration inhibitor may include at least one molecule of the formula $C_{10-25}CONH_2$.

DETAILED DESCRIPTION

The present disclosure provides a leaching process and resulting composition which prevents or substantially reduces agglomeration of polyamide 6/66 copolymers. The leaching process includes applying hot water in the presence of an agglomeration inhibitor to the polyamide 6/66 copolymers in order to separate unreacted caprolactam and small molecular weight oligomers from the copolymers while preventing or substantially reducing agglomeration of the copolymers.

Polyamide resins in the form of copolymers of polyamide 6 and polyamide 66 (polyamide 6/66 copolymers) are synthesized from caprolactam monomers and adipic acid/hexamethylenediamine monomers and then leached with water in the presence of an agglomeration inhibitor. The adipic acid and hexamethylenediamine components of the adipic acid/hexamethylenediamine monomers may be provided in a salt of 1:1 molar proportion, referred to as "AH salt", which may be either in solid form or in the form of an aqueous solution. The terms "adipic acid/hexamethylenediamine" and "AH salt" are used interchangeably herein.

I. Preparation of Polyamide 6/66 Copolymers

Caprolactam is traditionally used to form polyamide 6 via ring opening by hydrolysis, followed by polymerization. AH salts are traditionally used to form polyamide 66 via condensation polymerization. In the present process, caprolactam monomers and AH salt monomers are polymerized together to produce polyamide 6/66 copolymers including a majority component of monomers based on caprolactam and a minority component of monomers based on AH salt, i.e., adipic acid and hexamethylenediamine. As discussed further below, in the present polyamide 6/66 copolymers, the polymer chains include monomers, or repeating units, based on caprolactam and monomers, or repeating units, based on adipic acid and hexamethylenediamine, which are mutually present in the polymer chains according to a random or near random distribution.

In the present polyamide 6/66 copolymers, the caprolactam monomers make up as little as 80 mol. %, 90 mol. %, 94 mol. %, 95 mol. %, 96 mol. %, or as great as 97 mol. %, 98 mol. %, or 99 mol. %, based on the total moles of caprolactam and AH salt monomers, or within any range defined between any two of the foregoing values, such as 80 mol. % to 99 mol. %, 80 mol. % to 95 mol. %, 80 mol. % to 90 mol. %, or 80 mol. % to 85 mol. %, for example.

In the present polyamide 6/66 copolymers, the AH salt monomers make up as little as 1 mol. %, 2 mol. %, 3 mol. %, or as great as 4 mol. %, 5 mol. %, 6 mol. %, 10 mol. %, 18 mol. %, 20 mol. % based on the total moles of caprolactam and AH salt monomers, or within any range defined between any two of the foregoing values, such as 1 mol. % to 20 mol. %, 5 mol. % to 20 mol. %, 10 mol. % to 20 mol. %, or 15 mol. % to 18 mol. %, for example.

To form the present polyamide 6/66 copolymers, caprolactam and AH salt are blended together at elevated temperatures which may be as low as 145° C., 150° C., or 155° C., as great as 160° C., 165° C., or 170° C., or within any range defined between any two of the foregoing values, such 150° C. to 170° C., or 155° C. to 165° C., for example. The caprolactam and AH salt may be mildly agitated during heating to provide more uniform heat transfer and mixing. The AH salt may be combined with the caprolactam as a dry powder, or may be combined with the caprolactam as an aqueous solution, such as an aqueous solution containing as little as about 50 wt. %, 52 wt. %, 55 wt. %, or as great as 58 wt. %, 60 wt. % solids, or within any range defined between any two of the foregoing values, such 50 wt. % to 60 wt. % or 55 wt. % to 60 wt. %, for example. Further, particularly when AH salt is used as a dry powder, the caprolactam and AH salt may be blended in the presence of added water.

The mixture of caprolactam and AH salt, and optionally water, is polymerized at a temperature of approximately 230° C. to form the polyamide composition. The polymerization may be carried out using a batch continuously stirred tank reactor (CSTR), a VK tube, or by using a continuous polymerization train, for example. Excess water is removed to drive the reaction to equilibrium. Optionally, a terminating agent may be used to terminate the reaction. The resultant copolymer may be in the form of solid pellets.

II. Leaching of Polyamide 6/66 Copolymer Pellets

The polymerized pellets of the polyamide 6/66 copolymer are then leached in hot water with an agglomeration inhibitor for a period of time to remove or wash away any excess caprolactam and/or small molecular weight oligomers. The agglomeration inhibitor may be any long chain fatty acid of formula $C_{10-25}OOH$, or amide of formula $C_{10-25}CONH_2$. The long chains of the foregoing agglomeration inhibitors may contain branching or unsaturation. The residence time period in a continuous process during which the polymerized pellets are leached can be as little as about 2 hours, 3 hours, or 4 hours, or as great as 5 hours, 6 hours, or 8 hours, or within any range defined between any two of the foregoing values, such 3 hours to 4 hours or 4 hours to 5 hours, for example. In some embodiments, the temperature of the hot water may be as low as 80° C., or as high as 160° C., or more specifically between 90° C. and 140° C. Furthermore, in some embodiments, the leaching process may be carried out at atmospheric pressure or under various pressures, for example, the pressure may be as low as 0 psi, or as high as 80 psi, or more specifically between 20 psi and 40 psi.

The amount of agglomeration inhibitor used is as little as 0.05 wt. %, 0.1 wt. %, 0.2 wt. %, 0.4 wt. %, or 0.5 wt. %, or as great as 1.0 wt. %, 1.5 wt. %, or 2 wt. %, based on the total solids weight of the copolymer, or within any range defined between any two of the foregoing values, such as 0.05 wt. % to 2 wt. %, 0.1 wt. % to 1.5 wt. %, or 0.2 wt. % to 1 wt. %, for example.

By leaching the polymerized pellets in hot water with an agglomeration inhibitor, some of the acid and/or amine terminal end groups of the polymer molecules on or near the surfaces of the pellets are reacted and bound to the agglomeration inhibitor, resulting in a lower overall extent of termination. Each pellet itself is composed of individual polymer molecules having an exposed surface, a subsurface region proximate to the surface, and a core in the middle of the pellet covered by the subsurface region. After the application of the hot water including the agglomeration inhibitor, a difference exists in the degree of termination of the copolymer end groups between the surface, subsurface region, and the core of the pellets. The difference generally results in a gradient of change, such that in cross section, each pellet includes more agglomeration inhibitor terminated end group sites at the surface than at the core, which may have no agglomeration inhibitor terminated end group sites. As such, in some embodiments, the number of terminal end groups at or near the surface of the pellets is less than the number of terminal end groups within the core of the pellets. Alternatively conceptualized, the agglomeration inhibitor may be thought of as at least partially coating the surfaces of the pellets to prevent agglomeration of the pellets.

The agglomeration inhibitor may be stearic acid, for example, which reacts with the amine terminal end groups of the pellets, while in other embodiments, the agglomeration inhibitor may be stearamide, for example, which reacts with the acid terminal end groups of the pellets. Other agglomeration inhibitors include myristic acid (C14), palmitic acid (C16), linoleic acid (C18), and behenic acid (C22), for example.

III. Properties of the Polyamide 6/66 Copolymers

The leached polyamide 6/66 copolymers have a lower degree of end group termination, measured by titrating the terminal end groups, as compared to polyamide 6/66 copolymers leached only with hot water. In particular, the polyamide 6/66 copolymers leached in the presence of an agglomeration inhibitor have a degree of termination that may be as low as 20 mEq/kg, 25 mEq/kg, 30 mEq/kg, or as high as 40 mEq/kg, 50 mEq/kg, 70 mEq/kg, or 80 mEq/kg, or within any range defined between any two of the foregoing values, such as 20 mEq/kg to 80 mEq/kg, 30 mEq/kg to 70 mEq/kg, or 20 mEq/kg to 30 mEq/kg, for example.

The polyamide 6/66 copolymers leached in the presence of an agglomeration inhibitor also have a relatively low crush resistance as measured by a compression testing device according to ASTM 4179-11 as compared to polyamide 6/66 copolymers leached only with hot water. In particular, the polyamide 6/66 copolymers leached in the presence of an agglomeration inhibitor may have crush resistances as low as 1 lbf, 5, lbf, 10 lbf, or 15 lbf, or as high as 25 lbf, 35, lbf, 45 lbf, 55 lbf, or 65 lbf, or within any range defined between any two of the foregoing values, such as 1 lbf to 65 lbf, 5 lbf to 55 lbf, or 5 lbf to 25 lbf, for example.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

EXAMPLES

Formulations were tested using a compression testing device to determine crush resistance in accordance with ASTM D4179-11, and titration techniques to determine degrees of termination.

Example 1

Leaching with Stearic Acid

A 5 gallon leaching pot was charged with 12 pounds of nylon copolymer and 12 liters of water. Subsequently, a 20 gram dispersion of stearic acid was added to the mixture within the leaching pot. The dispersion of stearic acid was prepared by ballmilling 100 parts stearic acid with 100 parts water and 1 part sodium lauryl sulfate surfactant. The mixture was leached at 120° C., and samples were removed at 3, 6, and 9 hours.

TABLE 1

Crush Resistance and Amine Ends After Leaching

| Ref. No. | Mol. % Caprolactam | Mol. % AH Salt | Crush Resistance @ 3 hours (lbf) | Crush Resistance @ 6 hours (lbf) | Crush Resistance @ 9 hours (lbf) | Amine Ends @ 6 hours (mEq/kg) |
|---|---|---|---|---|---|---|
| Sample | 85 | 15 | 87 | 94 | 88 | 32 |
| Control | 85 | 15 | 52 | 23 | 8 | 26 |

Example 2

Leaching with Stearamide

A 5 gallon leaching pot was charged with 12 pounds of nylon copolymer and 12 liters of water. Subsequently, a 5 gram dispersion of stearamide was added to the mixture within the leaching pot. The dispersion of stearamide was prepared by ballmilling 100 parts stearamide with 100 parts water and 1 part sodium lauryl sulfate surfactant. The mixture was leached at 130° C. and samples were removed at 3, 6, and 9 hours.

TABLE 2

| | | | Crush Resistance @ 3 hours (lbf) | Crush Resistance @ 6 hours (lbf) | Crush Resistance @ 9 hours (lbf) | Amine Ends @ 6 hours (mEq/kg) |
|---|---|---|---|---|---|---|
| Ref. No. | Mol. % Caprolactam | Mol. % AH Salt | | | | |
| Sample | 82 | 18 | 87 | 94 | 88 | 35 |
| Control | 82 | 18 | 45 | 15 | n/a | 29 |

While this disclosure has been described as relative to exemplary designs, the present disclosure may be further modified within the spirit and scope of this disclosure. Further, this application is intended to cover such departures from the present disclosure as come within known or customary practice in the art to which this disclosure pertains.

The invention claimed is:

1. A method of improving agglomeration resistance of a polyamide polymer comprising the steps of:
   polymerizing at least one polyamide copolymer from caprolactam monomers and adipic acid and hexamethylenediamine monomers, the at least one polyamide copolymer including between 80 mol % and 99 mol % caprolactam monomers and between 1 mol % and 20 mol % of combined adipic acid and hexamethylenediamine monomers, based on the total moles of caprolactam monomers and adipic acid and hexamethylenediamine monomers; and
   leaching the at least one polyamide copolymer with a solution of water in the presence of an agglomeration inhibitor comprising stearamide at a temperature between 80° C. and 140° C.

2. The method of claim 1, wherein the amount of agglomeration inhibitor used in the leaching step is between 0.05 wt. % and 2 wt. %, based on the total solids weight of the copolymer.

3. The method of claim 1, wherein the at least one polyamide copolymer includes between 80 mol % and 85 mol % caprolactam monomers and between 15 mol % and 20 mol % adipic acid and hexamethylenediamine monomers, based on the total moles of caprolactam monomers and adipic acid and hexamethylenediamine monomers.

4. A method of improving agglomeration resistance of a polyamide polymer, comprising the steps of:
   forming at least one polyamide copolymer polymerized from caprolactam monomers and adipic acid and hexamethylenediamine monomers, the at least one polyamide copolymer including between 80 mol % and 99 mol % caprolactam monomers and between 1 mol % and 20 mol % of combined adipic acid and hexamethylenediamine monomers, based on the total moles of caprolactam monomers and adipic acid and hexamethylenediamine monomers, the at least one polyamide copolymer having an initial concentration of acid/amine terminal ends; and
   leaching the at least one polyamide copolymer with a solution of water in the presence of an agglomeration inhibitor comprising stearamide to reduce the initial concentration of acid/amine terminal ends by 5% to 25%.

5. The method of claim 4, wherein the leaching step is carried out at a temperature between 80° C. and 140° C.

* * * * *